United States Patent [19]
Akagiri et al.

[11] Patent Number: 4,783,792
[45] Date of Patent: Nov. 8, 1988

[54] APPARATUS FOR TRANSMITTING DIGITAL SIGNAL

[75] Inventors: Kenzo Akagiri, Yokohama; Masayuki Nishiguchi, Tokyo, both of Japan

[73] Assignee: Sony Corporation, Tokyo, Japan

[21] Appl. No.: 833,401

[22] PCT Filed: May 28, 1985

[86] PCT No.: PCT/JP85/00290
§ 371 Date: Jan. 28, 1986
§ 102(e) Date: Jan. 28, 1986

[87] PCT Pub. No.: WO85/05747
PCT Pub. Date: Dec. 19, 1985

[30] Foreign Application Priority Data
May 28, 1984 [JP] Japan ................. 59-108183

[51] Int. Cl.⁴ .................................. H04B 14/06
[52] U.S. Cl. .............................. 375/27; 375/31
[58] Field of Search ............. 375/27, 31, 35, 33, 375/34; 360/32; 332/11 R; 358/13, 133, 138, 260

[56] References Cited

U.S. PATENT DOCUMENTS

| | | | |
|---|---|---|---|
| 4,396,937 | 8/1983 | Reitmeier et al. | 358/13 |
| 4,491,953 | 1/1985 | Bellisio et al. | 375/27 |
| 4,593,398 | 6/1986 | Millar | 375/27 |
| 4,633,325 | 12/1986 | Usubuchi | 358/133 |

*Primary Examiner*—Benedict V. Safourek
*Attorney, Agent, or Firm*—Hill, Van Santen, Steadman & Simpson

[57] ABSTRACT

The invention is concerned with an apparatus in which one of a large number of previously provided prediction filters (4) is selected and digital signal is transmitted through the selected prediction filters (4). In order to select one of the prediction filters (4), the outputs from a small number of selection filters, such as straight PCM data from a memory (2) or the differential PCM data from a differential processing circuit (3), are compared to one another as by division in a divider circuit (5), and an optimum one of a large number of the prediction filters (4) is selected by a selecting signal resulting from the comparison. In this manner, it becomes possible to select one of a large number of the prediction filters by a small number of the selection filters and to increase the efficiency of the bit compression by a simplified arrangement or configuration.

7 Claims, 2 Drawing Sheets

APPARATUS FOR TRANSMITTING DIGITAL SIGNAL

TECHNICAL FIELD

This invention relates to an apparatus for transmitting digital signal such as PCM signal and, more particularly, to an apparatus for transmitting digital signal wherein transmission may be made with a low bit rate and a high compression efficiency.

BACKGROUND ART

In recent years, with progress in the digital technology, analog signals such as audio or video signals are sampled, quantized and encoded for transmitting, recording and/or reproducing as what is called pulse code modulated (PCM) signal.

In converting an analog signal into a PCM digital signal for transmission, the higher the sampling frequency, the wider the range of the transmittable analog signal and, the larger the number of quantization bits, the wider the dynamic range, all in a well-known manner. Therefore, when the original analog signal is to be transmitted with high fidelity, that is with a wide frequency band and a large dynamic range, a high sampling frequency and a large number of quantization bits are required, with the result that the number of bits to be transmitted per unit time or bit rate is increased.

However, the bit rate is limited by the properties of the transmitting medium or recording medium and the digital signal processing speed at the transmitting and/or receiving sides or at the recording and/or reproducing sides. As a matter of fact, in consideration of economy or cost performance in supplying the apparatus such as PCM signal recording and/or reproducing apparatus, it becomes critical to transmit, record or reproduce a high-quality signal at as low a bit rate as possible.

For transmitting large dynamic range signals with a lower bit rate, there is known in the art a digital signal processing system making use of linear prediction, such as differential PCM system. For example, in a system proposed by the present inventors, the digital signal data to be transmitted are grouped into blocks each comprised of a predetermined number of words and transmitted through one of a plurality of prediction filters. Three different kinds of the prediction filters are provided for outputting straight PCM data, differential PCM data and additive PCM data. The prediction filters or the PCM modes that will give the maximum data compression efficiency as a function of an input signal are selected every block. Selection of the PCM modes is by detecting the maximum absolute value of the straight PCM data in one block, the maximum absolute value of the differential PCM data in one block and the maximum additive PCM data in one block, and comparing the three maximum absolute values in the respective blocks to one another to find the PCM mode that will give the least value.

With a small number of the prediction filters or of the selectable PCM modes, such as three, the optimum prediction filter or PCM mode can be selected by computing the data of the respective PCM modes and directly comparing these various data to one another. However, when the number of the prediction filters is increased for further elevating the bit compression efficiency, or when the prediction filters are designed so that plural stages, of the prediction coefficients are selectable it becomes necessary to compute all filter output data of the selectable modes and hence to carry out high speed or parallel processing. This means a considerable load in hardware.

It is an object of the present invention to provide an apparatus for transmitting digital signals, in which, even when a larger number of the prediction filters or a larger number of types of the prediction filters are provided, it is possible to select an optimum one of a large number of the prediction filters including the selection filters as a function of the input signal by means of a simple construction employing selection filters of a number sufficiently smaller than that of the prediction filters, so that elevation of hardware costa may be avoided.

DISCLOSURE OF THE INVENTION

According to the present invention, an apparatus for transmitting an input digital data signal through one of a plurality of prediction filters, wherein, the input digital data signal is supplied to a certain number of selection filters which is less than the number of the prediction filters, an optimum one of the prediction filters including the selection filters is selected by a selection signal resulting from the comparison of the output data from the selection filters, and the input signal data is transmitted through the selected prediction filters. Thus, with the extremely simple construction employing the selection filters of a number smaller than that of the prediction filters, an optimum prediction filter (or occasionally the selection filter) may be selected as a function of the input signal so as to easily improve the compression efficiency and the S/N ratio. The selection signal can be derived on the basis of the ratio of the respective maximum absolute values or of the ratio of the energy contents of the respective output data from the selection filters, so that an optimum one of a large number of the prediction filters can be selected with the use of the smaller number of the selection filters.

BEST MODE FOR PRACTICING THE INVENTION

Figure 1:
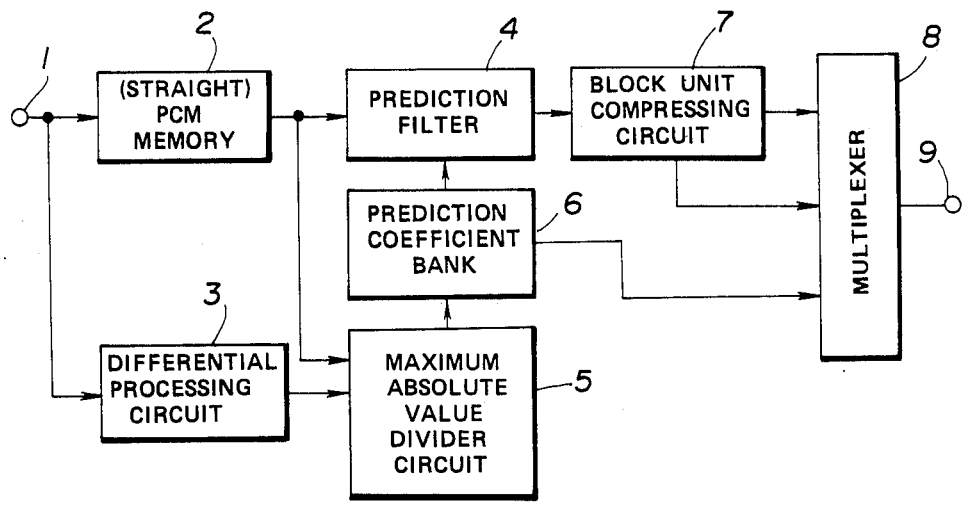
FIG. 1 is a block circuit diagram showing an encoder used in an embodiment of the present invention.

FIG. 1 is a block circuit diagram showing an encoder used in an embodiment of the apparatus for transmitting digital signals according to the present invention.

In this figure, the PCM data signal (straight PCM data signal) of 14-bits-per-word for example, which is obtained by sampling an analog input signal, such as an audio or video signal, with a predetermined frequency $f_s$ and quantizing the sampled values is supplied to an input terminal 1 of an encoder. A predetermined number of words, such as n words, of the sampled data of the input digital signal are grouped into one block so that a adaptive prediction filtering processing predictive or compression processing will be carried out by the block as an unit.

The straight PCM data supplied to the input terminal 1 are forwarded to a block memory 2 and a differential processing circuit 3. The block memory 2 stores one block, i.e. n words, of the straight PCM data. The data read out from the memory 2 is supplied to a prediction filter 4 and a maximum absolute value divider circuit 5. The data from the differential processing circuit 3 is also supplied to the maximum absolute value divider circuit 5.

Figure 2:
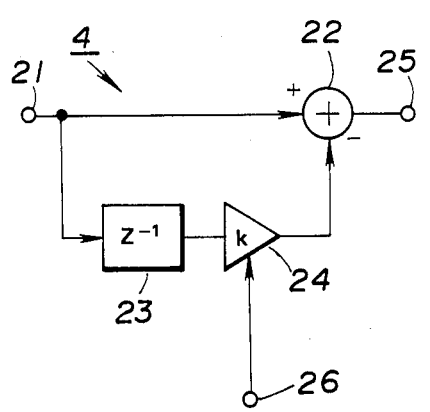
FIG. 2 is a circuit diagram showing a practical example of the prediction filter shown in FIG. 1.

The prediction filter 4 is adapted to show one of a plurality of prediction filter characteristics by the commutative selection of a plurality of prediction coefficients stored in a prediction coefficient bank 6. The simplest form of the filter is possibly the linear differential filter shown in FIG. 2. In the linear differential prediction filter 4 shown in FIG. 2, an input terminal 21 is supplied from the memory 2 with straight PCM data which is directly supplied to an adder 22, which in effect is a subtractor performing a subtractive operation, as well as to a delay element 23 so as to be delayed by one sample, and then to a coefficient multiplier 24 so as to be multiplied by a prediction coefficient k to give what is called a linear predictive value, which is supplied as subtractive input to the adder 22. Therefore, the prediction error output data y taken out at an output terminal 25 from the adder 22 is given by the input data x to the input terminal 21 as follows;

$$y_i = x_i - k x_{i-1}$$

where i denotes the sampled word number. The prediction coefficient bank 6 stores a plurality of the prediction coefficients, for the coefficient multiplier 24 one of which is selected and supplied via terminal 26 to the coefficient multiplier 24.

By the commutative selection of a plurality of, for example, m prediction filters, one of a plurality of, for example m prediction filter characteristics can be selected. Such selection is tantamount to selecting one of m predictive filters having mutually different characteristics. Such selection of the predictive filter is effected responsive to the encoder input signal to the encoder shown in FIG. 1, so that basically, the predictive filter having the maximum bit compression factor is selected.

The apparatus for transmitting digital signal according to our previously proposed system is operable to select one of three prediction filters with prediction coefficients k equal to 1, 0 and −1. More specifically, selection of the prediction filters is equivalently carried out by selecting one of three different modes, that is, the differential PCM mode for k=1, the normal or straight PCM mode for k=0, and an additive PCM mode for k=−1. According to this preceding technique, the maximum absolute values of the respective modes in one block are detected in the manner as mentioned hereinabove, then compared to one another for selecting the mode having the least value. However, the method in which the data is calculated for each mode or each prediction filter and the respective maximum values in one block is detected is inconvenient in view of the voluminous operation of the data calculation and the resulting considerable load in the hardware in case of the increase in the number of the selectable modes or of the prediction filters.

In an embodiment of the present invention, there is used a maximum absolute value divider circuit 5 in which the ratio of for example the maximum absolute value in one block of the straight PCM data to for example the maximum absolute value in one block of the data from the differential processing circuit 3 is calculated and a selection signal obtained as a function of the so obtained ratio or quotient is used for selecting the prediction coefficient stored in the prediction coefficient bank 6 so as to select the filter characteristics of the prediction filter 4.

If the path for producing the straight PCM data is considerd to be a filter in the broad sense of the term, two filters are used in this case for performing a selection from among a plurality of filters having mutually different characteristics, that is, the filter for outputting the straight PCM data and the differential processing circuit 3. It becomes possible to select one of three or more prediction filters in dependence upon the information based on the data from these two selection filters, such as, the results of comparison for example, the ratio between the maximum absolute values in the aforementioned blocks or between the energy contents in the blocks in turn obtained by taking the sum of the square values of the respective data in the blocks, for instance.

When the maximum absolute values in the respective blocks are used as the information based on the respective data from the two filters for selecting the predictive filters, that is, the straight PCM data, and the data processed by the differential processing circuit 3, it is preferred that the differential processing circuit 3 be phase-linear in the filter characteristics thereof.

Figure 3:
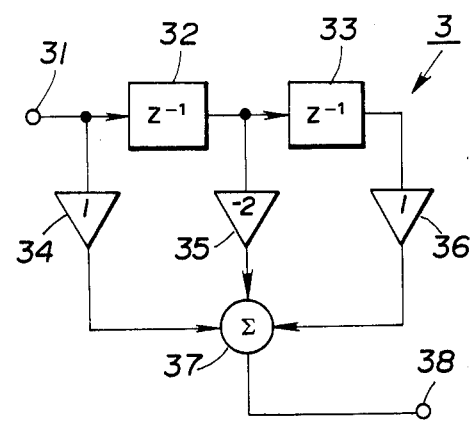
FIG. 3 is a circuit diagram showing a practical example of the difference processing circuit shown in FIG. 1.

FIG. 3 shows, the structure of an FIR filter which takes the quadratic differential of the input data, as an example of the differential processing circuit 3 having the phase-linear filter characteristics. Referring to FIG. 3, an input terminal 31 of the differential processing circuit 3 that takes the quadratic differential is supplied with the straight PCM data from the input terminal 1 of the encoder. The circuit 3 is comprised of two delay elements 32 and 33, three coefficient multipliers 34, 35 and 36 and an adder 37. Each of the delay elements 32 and 33 is operable to delay the data by one sample. The multiplication coefficients from the multipliers 34, 35 and 36 are equal respectively to 1, −2 and 1. Thus, with the input data x, the output data y taken out from the adder 37 through an output terminal 38 is given by $$y_i = x_i - 2x_{i-1} + x_{i-2}$$

where i denotes the sample word number. It will be that $x_{i-1}$ and $x_{i-2}$ represent the input data preceding the first input data $x_i$ by one sample and two samples.

The reason of using the differential processing circuit 3 having the phase linear filter characteristics such as the quadratic differential FIR filter is now explained. When a selection filter of non-phase-linear such as a linear differential is used, the peak of the input signal waveform is art to be shifted out of the block due to the phase characteristics of the so filter that the correct maximum absolute value in the block is not obtained. In order to prevent this, phase-linear filter characteristics of the differential processing circuit 3 are preferred. In general, the characteristics of the FIR filter having symmetrical coefficients such as 1, −2 and 1 of the respective multipliers 34, 35 and 36 shown in FIG. 3 are phase-linear.

In the divider circuit 5, the following division is carried out, based on the maximum absolute value D in each block of the data supplied from the differential processing circuit 3 having the above described phase-linear filter characteristics and X the maximum absolute value X of the straight PCM data:

$$R = \frac{X}{D}$$

The relation between the value of the ratio R resulting from the division and the prediction coefficient k of the prediction filter 4 can be set, for example, as shown in the following Table 1.

TABLE 1

| ratio R | 60 | 6 | 1 | 0.5 |
|---|---|---|---|---|
| prediction coefficient k | 0.9 | 0.5 | 0.1 | −0.3 |
| frequency $f_{in}$ of an input signal (Hz) | 100 | 1K | 5.3K | 10K |

In the Table 1, an example is shown in which the sampling frequency $f_s$ of the original analog signal is set to be equal to 32 kHz. The prediction coefficient k in the prediction coefficient bank 6 is selected by a selecting or controlling signal on the basis of the ratio R from the maximum absolute value divider circuit 5 for setting the filter characteristics of the prediction filter 4.

Turning again to FIG. 1, the output data from the prediction filter 4, whose characteristics have been set in the above described manner, are supplied to a multiplexer 8 by way of a blockunit compression circuit 7. The circuit 7 is operative to re-quantize the one-block data from the prediction filter 4 into, data of for example, 7-bits-per word at the quantum step widths conforming to the maximum absolute value in the block. More specifically, the data of 14-bit-per-word is represented by the floating point system with 7 bits in the mantissa part and with 3 bits in the index part, which is common to all the words in one block. In this manner, a highly efficient bit compression is realized. For performing the block floating, the data of all the words in the concerned block is shifted by a number of bits required for normalizing the absolute maximum values within the block. The amount of bit shift or the index value is indicated in the form of binary codes so as to be used as range information (compression or adaptive information), whereas the upper seven bits of the shifted words in the block are taken out by the respective mantissa data. Alternatively, a blockunit bit compression may be also obtained by such as non-linear quantization.

The multiplexer 8 is also supplied, for example, with range information data of 3-bits-per word corresponding to the index values and filter characteristics selection data (or prediction coefficient selecting data) from the prediction coefficient bank 6, other than the above described blockunit compressed data, for example, of 7-bits-per-word. Of those data, only one word for each of the range information data and the filter characteristics selecting data is sufficient per block. In addition, the larger the number of sampled data words in one block, the higher the bit reduction efficiency in data transmission.

The data thus supplied to the multiplexer 8 is converted for example every block unit into a serial data sequence of a predetermined format so as to be taken at the output terminal for transmission by way of a transmission or recording medium.

Preferably, a sampled data to be used as a reference is for one word so-called (reference word) is provided per block. It is preferable to use the original straight PCM data of 14-bits as the reference word.

Figure 4:
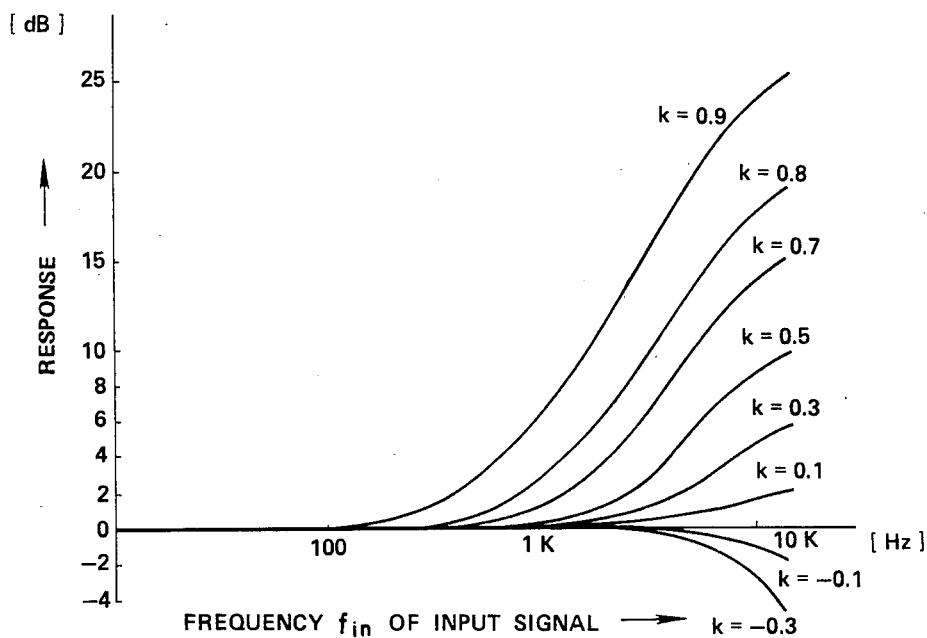
FIG. 4 is a chart showing a frequency response of the prediction filter used in the encoder.

FIG. 4 shows the changes in the frequency response plotted against the prediction coefficient k of the prediction filter 4 in the above described encoder. In this figure, since such a normalization that the sampling frequency $f_s$ is set to be equal to 32 kHz, and the response at the extremely low frequency for example 1 Hz, of the respective characteristics is equal to 0 dB, is carried out the changes of the frequency response for the coefficient k is clearly illustrated.

Figure 5:
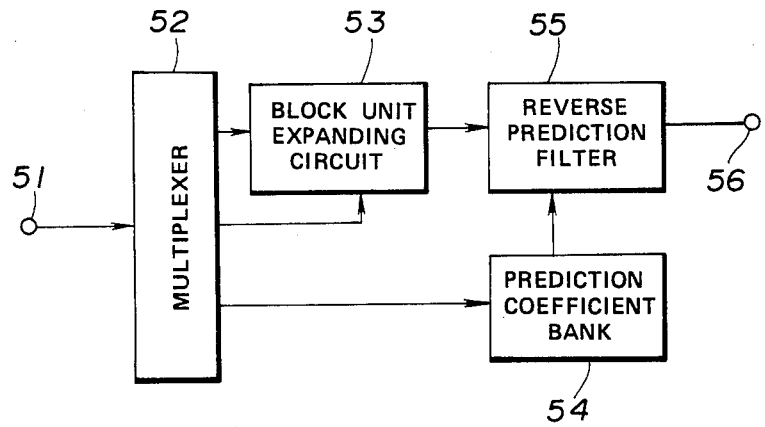
FIG. 5 is a block circuit diagram showing a decoder used in the above embodiment.

The digital signal outputted at the output terminal 9 of the encoder in FIG. 1 is transmitted to and restored by the decoder shown for example in FIG. 5 into the original straight PCM data signal.

In FIG. 5, the transmitted digital signal is supplied from the input terminal 51 into the multiplexer 52 so as to be divided into the various data contained in one block. The data obtained from the multiplexer 52, and compressed every blockunit in the above described manner such as the data of 7-bits-per-word is supplied to a blockunit expansion circuit 53 which performs the reverse of the operation performed by the blockunit compression circuit 7 respective to the information data received from the multiplexer 52. From the blockunit expansion circuit 53 is supplied the data similar to those obtained from the prediction filter 4 of the encoder in FIG. 1, which is supplied to a reverse prediction filter 55 which takes for example the linear additive. The prediction coefficient bank 54 is supplied with the aforementioned filter characteristics selecting data (or prediction coefficient selecting data) from the multiplexer 52. Responsive to these selecting data, filter characteristics which are the reverse of those of the prediction filter 4 during encoding are selected for the reverse prediction filter 55 so that the original straight PCM data is restored and taken at the output terminal 56.

The frequency response of the reverse prediction filter 55 in the decoder of FIG. 5 is symmetrical to that shown in FIG. 4, that is, such a manner that the dB value of the response is reversed about the 0 dB line as center, as a function of the selected prediction coefficient.

Considering the SN ratio in the case of digital signal transmission with the use of the above described encoder and decoder, it is preferred that, in case that the frequency $f_{in}$, of the input signal is low, gain of the high frequency band is increased at the encoder side for the transmitting with high frequency band intensifying characteristics, and the gain in the high frequency band is correspondingly reduced at the decoder side, what corresponds to selecting the prediction coefficient k of the prediction filter 4 to a large value. It is also preferred from the viewpoint of improvement of S/N ratio that, in case that the frequency $f_{in}$ is in the mid range, gain in the high frequency band is lowered at the encoder side and, for the frequency $f_{in}$ is high, the gain in the high frequency band is decreased slightly. This is equivalent to decreasing the positive value of the prediction coefficient k of the prediction filter through zero to negative values as the frequency $f_{in}$ is changed from the mid range to the higher range. Such selection of the prediction coefficient k as a function of the frequency $f_{in}$ of the input signal may be realized by selecting the ratio k to a larger value as the ratio R obtained at the maximum absolute value divider circuit 5 is increased, as may be seen from Table 1.

In the above embodiment, two different kinds of selection filters are used as filters for selecting the prediction filter (or selecting the filter characteristics of the prediction filter 4), that is, the differential processing circuit 3 of phase-linear filter characteristics that take the quadratic differential, and a flat pass filter, or a filter in the broad sense of the term, that directly outputs the straight PCM data input. The maximum absolute values in the respective blocks of the differential processed data or the straight PCM data outputted from these filters for selecting the prediction filters are found and their ratio is taken so that the prediction coefficient k is selected as a function of the resulting ratio R. As an alternative, the sum of the square values of the respective data or energy contents per block of the data supplied from each selection filter may be found and the ratio is taken. Suppose that, with the energy $E_X$ within the block of the straight PCM data and the energy $E_D$ within the block of the differential processed data, the ratio $R_E$ may be found by an equation $$R_E = \frac{E_X}{E_D}$$

In this case, the prediction coefficient k of the prediction filter 4, may be mapped in the prediction coefficient bank 6 in such a manner as to give the value of k that is increased with increase in the value of the ratio $R_E$. The differential processing circuit to be used for selecting the prediction filter on the basis of the ratio of energy contents in a block need not be of phase-linear filter characteristics that are proper to the differential processing circuit 3 of the above described embodiment. For example, the simplest filter that takes the linear differential will be sufficient.

In addition, three or more filters for selecting the prediction filters may be used. More specifically, band pass filters which will divide an input signal into several frequency bands may be used as the aforementioned filters. The energy contents of the output data from these band-pass filters in a block are compares to one another, out of a number of prediction filters larger than the number of the selection filters may be selected as a function of the energy distributions in the respective frequency bands or the frequency bands that will give the maximum energy.

In addition, although the filter that will take the linear differential is used as the aforementioned prediction filter 4, the filter that will take the quadratic differential or the higher order differential may also be used. In that case, a plurality of coefficient characteristics will be required for a filter characteristics, so that selection of the aforementioned prediction filters cna be made by selecting one of a plurality of sets of the prediction coefficients corresponding to the plural filter characteristics. It is also to be noted that, in case of the re-quantizing in the blockunit compression circuit 7, noise shaping by the error feedback as disclosed in our copending patent application No. 700,817 filed Jan. 31, 1985 proposed by the present inventor may be carried out for changing the noise spectrum as a function of the selection of the prediction filter. Various other changes can be made without departing from the scope of the present invention.

In the above embodiment, the selection filters and the prediction filters are shown as separate units or elements. However, in a practical hardware construction, the respective filters are occasionally expressed in the software artifice by the time divisional processing with the aid of what is called the digital signal processor (DSP) so that it is not necessary to distinguish selection filters from prediction filters. Alternatively, an optional mode may be provided directly output the data from the selection filter, or the selection filters may be provided as part of a large number of the prediction filters.

The above described apparatus for transmitting digital signal may be advantageously employed for transmission of the digital signal converted from the analog signal, for example, digitalaudio or digitalvideo signal. Thus it can be applied for the purpose of transmitting the analog signal at the low bit rate without degrading the quality of the original analog signal, or of recording the signal on the recording medium after bit compression.

We claim:

1. Apparatus for transmitting digital signals by transmitting an input digital data signal through a prediction filter having one of a plurality of predetermined sets of characteristics, characterized by the combination comprising:
   a plurality of selection filters,
   means for supplying said input digital signals to the inputs of said plurality of selection filters, the number of said plurality being less than the number of said plurality of sets,
   means for storing parameters corresponding to said sets,
   means for selecting said parameters corresponding to one of said sets corresponding to a set of characteristics for said prediction filter in response to a selecting signal,
   comparison means connected to receive and compare the outputs of said plurality of selection filters for generating said selecting signal in response to the comparison of output data from said selection filters,
   means for configuring said prediction filters in accordance with said selected parameters, and
   means for transmitting signals equal to said input digital data signals through said prediction filter.

2. The apparatus according to claim 1 characterized in that said selection filters comprise a straight PCM data outputting filter as one selection filter and a differential processing circuit as another selection filter.

3. The apparatus according to claim 2 characterized in that the differential processing circuit has phase-linear fitler characteristics.

4. The apparatus according to claim 3 characterized in that the differential processing circuit shows FIR filter characteristics that takes the quadratic differential of the input data.

5. The apparatus according to claim 1 characterized in that said plural prediction filters are comprised of linear differential filters having the prediction coefficients k, with k being 0.9, 0.5, 0.1 and −0.3.

6. An apparatus according to claim 1, characterized by means for dividing the energy content of the respective output data from the selection filters to produce said selecting signal.

7. The apparatus according to claim 1, characterized by means responsive to the outputs of a plurality of said selection filters, for detecting the maximum absolute value of the output data from each of said selection filters, and means for dividing the maximum absolute value of the output data from one of said selection filters by the maximum absolute value of the output data from the other of said selection filters for producing said selecting signal.

* * * * *